No. 733,701. PATENTED JULY 14, 1903.
W. J. DALTON.
COMBINED NOZZLE AND TAP.
APPLICATION FILED FEB. 4, 1902.
NO MODEL.
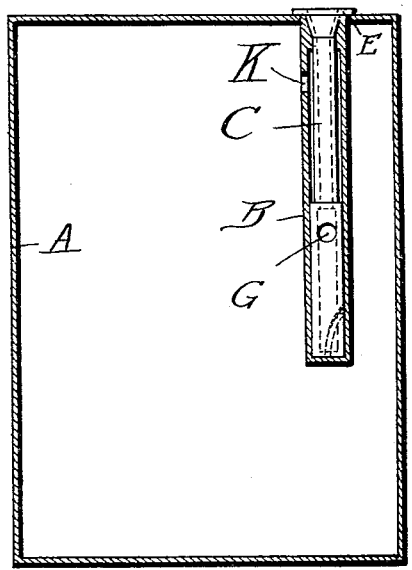
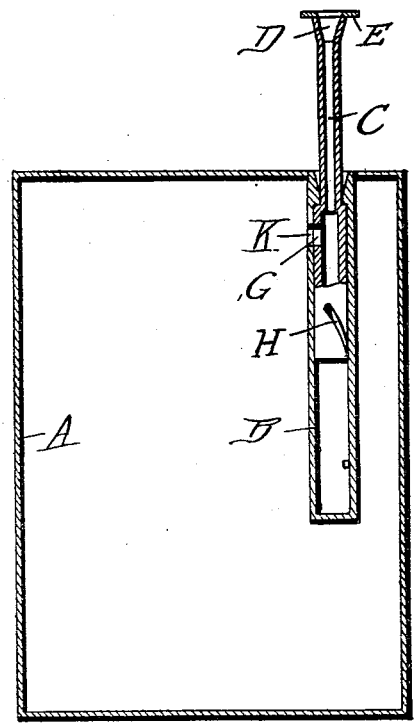
Attest:
J. O. Middleton
Edw. L. Reed
Inventor
William James Dalton
by Richards & Co.
atty's No. 733,701. Patented July 14, 1903.

UNITED STATES PATENT OFFICE.

WILLIAM JAMES DALTON, OF AUCKLAND, NEW ZEALAND.

COMBINED NOZZLE AND TAP.

SPECIFICATION forming part of Letters Patent No. 733,701, dated July 14, 1903.

Application filed February 4, 1902. Serial No. 92,562. (No model.)

*To all whom it may concern:*

Be it known that I, WILLIAM JAMES DALTON, a subject of the King of England, and a resident of Auckland, New Zealand, have invented certain new and useful Improvements in a Combined Nozzle and Tap, of which the following is a specification.

The object of my invention is to provide a form of spout which will be automatically opened when pulled out and similarly closed when pushed in, in which latter position it will be concealed.

The invention is illustrated in the accompanying drawings, in which—

Figure 1 is a view of a can with my invention applied thereto, the spout being extended in the act of pouring. Fig. 2 is a similar view with the spout pushed in.

In the drawings, A indicates a can-body in which is inserted and secured an outer tube B, which is closed at its inner end and open at its outer end. Within the outer tube is arranged a sliding inner tube C, which likewise has a closed inner end. A lateral opening G in the wall of the tube C is designed to aline with a similar opening K in the wall of the outer tube when the inner tube is partially drawn out, so that the liquid contents of the can may flow through the alining openings and through the exit-opening D. When the inner tube is pushed in, the openings G and K are out of alinement, and the opening G is opposite an intact portion of the wall of the outer tube, and hence escape of liquid is impossible.

I prefer to provide a spiral groove in the wall of the inner tube, in which a projection from the outer tube travels and partially rotates said inner tube as it moves in or out. I also prefer to provide a cap E on the end of the inner tube overlapping the joint when the inner tube is pushed in.

What I claim as my invention, and desire to secure by Letters Patent, is—

In combination with a vessel, a tube carried thereby having a closed inner end and a lateral opening communicating with the interior of the vessel, and a telescoping tube sliding within said first-named tube and having an opening in its side wall and a delivery-opening at its outer end, and a projection from one of said tubes engaging a spiral groove in the other, substantially as described.

WILLIAM JAMES DALTON.

Witnesses:
BRAYBROOKE FEATHERSTONE GRIFFIN,
WILLIAM JOHN LAWSON.